June 21, 1966 J. A. CLARK ETAL 3,256,907
DEVICE FOR GAUGING, METERING OR MEASURING LIQUIDS
Filed April 28, 1964 3 Sheets-Sheet 1

INVENTORS
JAMES A. CLARK,
JOHN O. MORRISON,
BY

McMorrow, Berman & Davidson
ATTORNEYS.

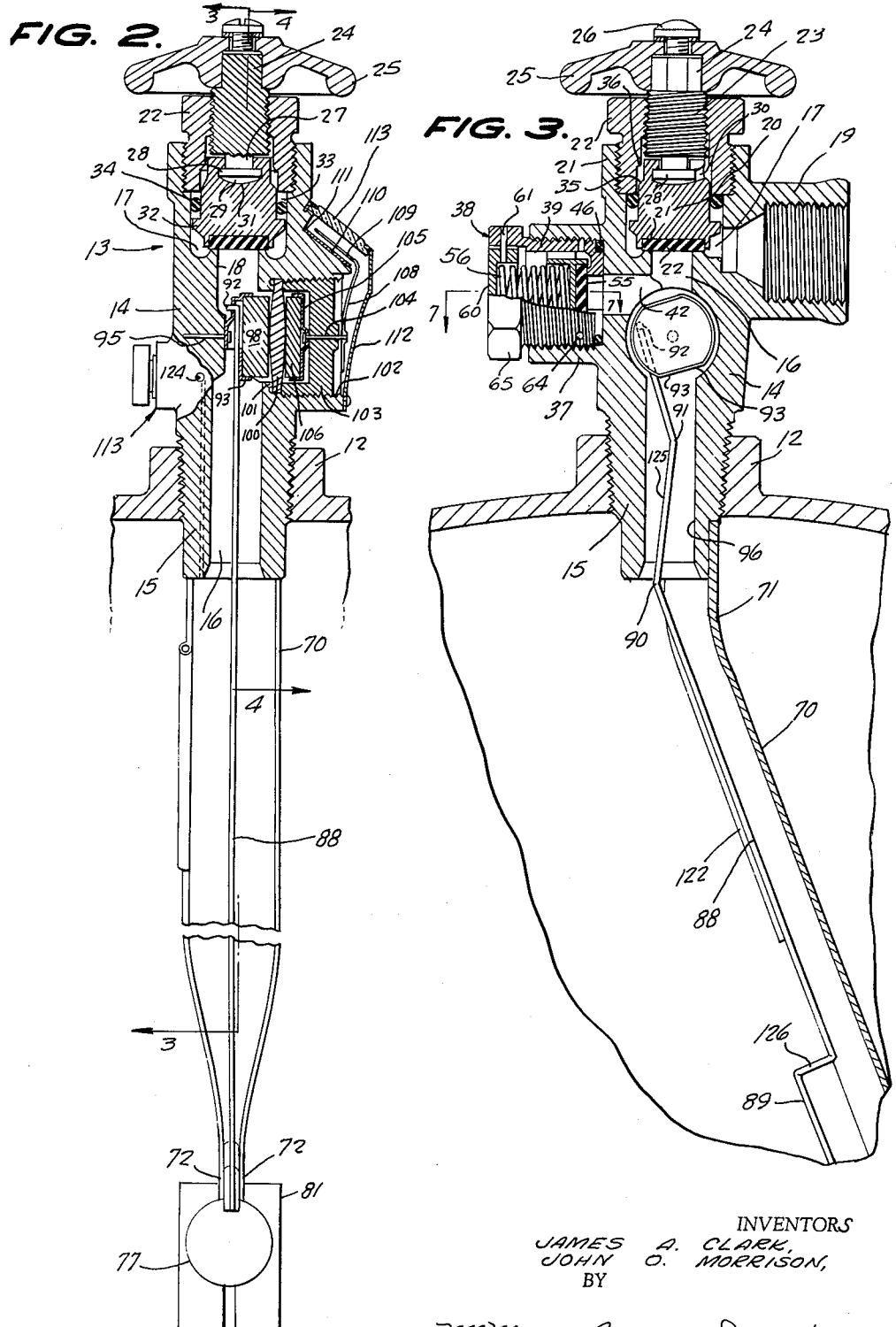

June 21, 1966 J. A. CLARK ETAL 3,256,907
DEVICE FOR GAUGING, METERING OR MEASURING LIQUIDS
Filed April 28, 1964 3 Sheets-Sheet 3
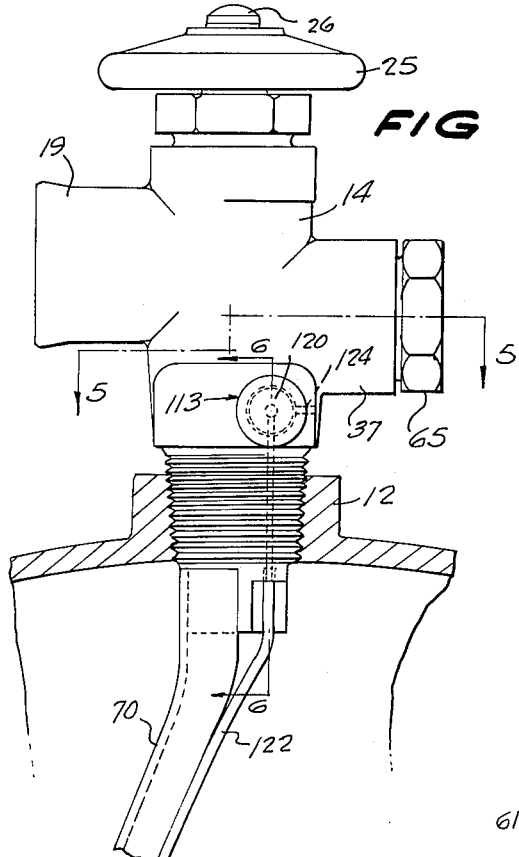
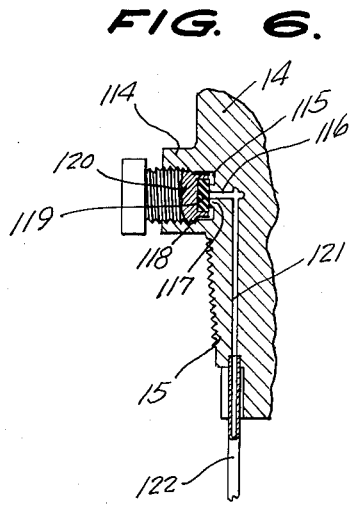
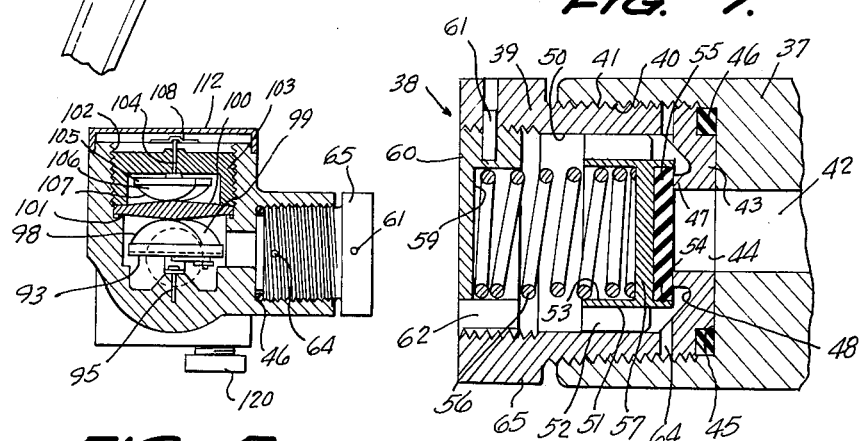
INVENTORS.
JAMES A. CLARK,
JOHN O. MORRISON,
BY
McMorrow, Berman & Davidson
ATTORNEYS.

United States Patent Office 3,256,907
Patented June 21, 1966

3,256,907
DEVICE FOR GAUGING, METERING OR MEASURING LIQUIDS
James A. Clark, 1143 W. Diamond St., Butte, Mont., and John O. Morrison, P.O. Box 610, Worland, Wyo.
Filed Apr. 28, 1964, Ser. No. 363,115
9 Claims. (Cl. 137—558)

This invention relates generally to metering valves for liquid containers and more particularly to an improved combination shut-off and safety relief valve structure combined with level-indicating gauge means adapted to be employed with a vessel containing liquids under pressure, for example, gases which are liquefied and maintained under pressure, such as gases of the hydrocarbon group including propane, butane, or the like.

A main object of the invention is to provide a novel and improved combination shut-off valve, safety relief valve, test valve, and level-indicating gauge structure adapted to be employed with a container intended to confine liquids under pressure, the assembly being relatively simple in construction, being easy to install on a container or to remove therefrom, and having parts which are readily replaceable without requiring the use of any complicated, expensive, or unusual tools.

A further object of the invention is to provide an improved combination shut-off valve, safety relief valve, test valve, and liquid level indicating means adapted to be employed with a vessel containing liquid under pressure, the shut-off portion of the assembly being highly efficient in operation, by employing a simple O-ring sealing element in a novel and highly efficient manner and in a manner which prevents damage thereto while maintaining a high degree of sealing efficiency, the shut-off valve structure being arranged so that its parts are easily replaceable, and the valve incorporating a novel and highly efficient lubricant-retaining medium utilizing the principle of capillary attraction.

A still further object of the invention is to provide an improved shut-off valve structure to be used on a vessel containing liquid under pressure, said valve structure having a positive, manually operable sealing action in both its open and closed positions, being provided with means to automatically lubricate portions thereof which are under contact pressure, said portions being arranged in a substantially pivotal relationship resembling a ball and socket joint and including lubricant therebetween which is distributed by capillary attraction.

A still further object of the invention is to provide an improved combination metering and liquid level indicating assembly for use with a vessel containing liquid under pressure, the assembly incorporating improved safety relief valve means which is efficient in operation, which is readily removable and replaceable, as required, and which can be removed or replaced by ordinary tools.

A still further object of the invention is to provide an improved safety relief valve arrangement in a combination metering and liquid level-indicating assembly for use with vessels containing liquids under pressure, the safety relief valve structure being readily replaceable so that a safety relief valve structure for a particular limiting pressure may be installed easily and rapidly without the necessity of removal or modification of the main metering valve and level-indicating assembly.

A still further object of the invention is to provide an improved safety relief valve structure in a metering and liquid level-indicating assembly for a vessel containing liquid under pressure, the relief valve structure being provided with means to clean out or blow off undesirable refuse, dirt, sand, or moisture, whereby to accomplish a cleaning action therein, without in any way changing or altering its limiting pressure setting.

A still further object of the invention is to provide an improved safety relief valve structure in a metering and liquid level-indicating assembly for a vessel containing liquid under pressure, said safety relief valve structure employing a seal of the O-ring type and being provided with means to prevent damage to the O-ring element thereof from excessive tightening action on the safety relief valve unit.

A still further object of the invention is to provide an improved metering and liquid level indicating assembly for use with a vessel containing liquid under pressure wherein the level-indicating structure involves relatively simple components, is of durable construction, is highly sensitive and accurate, and which is foldable to a transverse cross sectional size small enough to be inserted through the neck opening of a conventional pressure liquid-containing vessel having a relatively small neck.

A still further object of the invention is to provide an improved combination metering and level-indicating assembly for use on a vessel containing liquid under pressure, the level-indicating assembly being provided with highly sensitive and accurate level-indicating means including a pair of permanent magnets so placed as to operate on either side of a sealed gas-tight partition, one side being exposed to the pressure of the fluid in the container and the other side being outside the container and subject only to atmospheric pressure, the magnets being mounted in a highly efficient and effective manner, being easy to install, being self-positioning and retaining, and requiring no holes, notches, grooves, undercuts, indentations, humps, or shoulders to be formed therein.

A still further object of the invention is to provide an improved combination metering and level-indicating structure for use with a vessel containing liquid under pressure, the assembly improved indicating means having a novel crank mechanism including safety stop means to prevent rotation beyond desirable limits of various rotating elements of the mechanism, having link rod means connecting parts of the level-indicating mechanism which are inexpensive and easy to construct, and requiring simple fastening means for connecting the same.

A still further object of the invention is to provide an improved combination metering and level-indicating structure for use with a vessel containing liquid under pressure, wherein the indicating portion of the assembly employs a pair of cooperating magnets which are sealed off from each other in a gas-tight manner but which cooperate magnetically, one of the magnets being operated by the level-responsive mechanism of the assembly and the other magnet driving an indicating pointer, the assembly providing accurate results, being economical and inexpensive to fabricate, and being very compact in size.

A still further object of the invention is to provide an improved combined metering and level-indicating assembly for use on a vessel containing liquid under pressure, the indicating assembly being efficiently protected against the entry of dirt, moisture or other outside foreign material, being highly visible so that it is easy to read, and the assembly being provided with test valve means for checking the accuracy of calibration of the indicating pointer with relation to its scale.

Further objects and advantages of the invention will become apparent from the following description and claims, and from the accompanying drawings, wherein:

FIGURE 2 is an enlarged fragmentary vertical cross sectional view taken substantially on the line 2—2 of FIGURE 1.

FIGURE 3 is a vertical cross sectional view taken substantially on the line 3—3 of FIGURE 2.

FIGURE 4 is a fragmentary vertical cross sectional view taken through the top portion of the container of FIGURE 1, substantially on the line 4—4 of FIGURE 2.

FIGURE 5 is a horizontal cross sectional view taken substantially on the line 5—5 of FIGURE 4.

FIGURE 6 is a fragmentary vertical cross sectional view taken substantially on the line 6—6 of FIGURE 4.

FIGURE 7 is an enlarged horizontal cross sectional view taken substantially on the line 7—7 of FIGURE 3.

Figure 1:
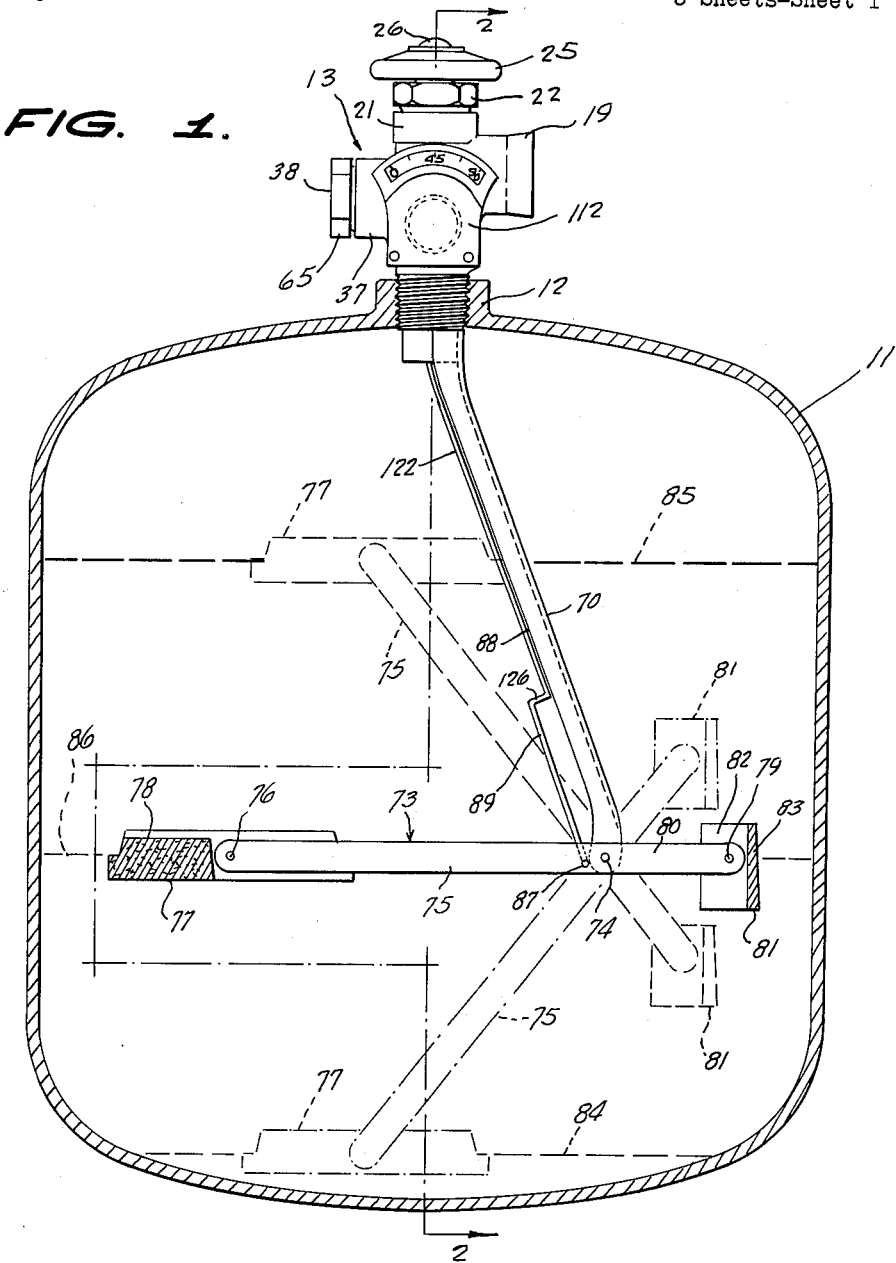
FIGURE 1 is a vertical cross sectional view taken through a vessel adapted to contain liquid under pressure and provided with an improved combination metering and level-indicating assembly constructed in accordance with the present invention.

Referring to the drawings, 11 designates a standard gas cylinder or bottle of the type adapted to contain a supply of liquefied gas, for example, gases liquefied and maintained under pressure in the hydrocarbon group such as propane, butane, or the like. The container 11 is provided with a relatively small neck portion 12 at its top end, the neck portion 12 being internally threaded, and threaded therein in the manner illustrated in FIGURE 1 is a combination shut-off valve, safety relief valve, and level-indicator according to the present invention, designated generally at 13.

The assembly 13 comprises the main body 14 having the externally threaded depending lower portion 15 adapted to be threadedly engaged in the neck 12 of the conventional gas bottle 11. The body 14 has the main bore or passage 16 leading to an enlarged upper cavity 17 of generally cylindrical shape formed in the top end of the body 14, the body being formed with the annular valve rim or seat 18 projecting upwardly centrally in the bottom of the cavity 17, as is clearly shown in FIGURE 2.

The body 14 is integrally formed with the laterally extending outlet conduit portion 19 which communicates with the lower end of the cavity 17, as shown in FIGURE 3, and which is adapted to be connected to the conduit leading to the device to be supplied with the fluid from bottle 11, or alternatively, when the bottle is to be refilled, to the supply source for refilling the bottle.

As is clearly apparent from FIGURES 2 and 3, communication between the conduit member 19 and the main body passage 16 is controlled by a cut-off valve assembly comprising a valve body 20 which is slidably and loosely mounted in the cylindrical cavity 17 and which is formed at its bottom with a circular recess 21 in which is secured a sealing disc 22 which is sealingly engageable with the annular rim 18 to close off communication between conduit member 19 and passage 16, as illustrated, for example, in FIGURES 2 and 3, but which may be elevated to establish such communication by elevating the valve body member 20.

The valve main body 14 has the upstanding annular top portion 21 coaxial with the passage 16 and the cavity 17, and internally threaded in said top portion 21 is the bushing member 22. Threadedly engaged in the bushing member 22 is the externally threaded valve stem member 23 which has a non-circular top end 24 which may be of hexagonal or other polygonal cross sectional shape and on which is lockingly engaged a hand wheel 25, the hand wheel being secured to the stem 23 by a fastening bolt 26 extending axially through the wheel 25 and being threadedly engaged axially in the stem portion 23, the head of the bolt serving to retain the hand wheel 25 in rigidly locked relationship with the stem member 23.

The stem member 23 is formed with a depending axial reduced stud portion 27 terminating in the enlarged bottom head 28 having a generally spherical bottom surface 29. The head 28 is rotatably connected to the top end of the valve body member 20 by being engaged in a generally T-shaped groove 30 formed in the top end of the member 20 and opening at one side thereof.

The T-shaped groove 30 is formed at its inner end and substantially coaxially with the member 20 with the generally spherical bottom wall 31 which has a convex surface of slightly greater radius than the concave spherical surface of the bottom portion 29 of stud 27. The smaller radius member 29 is engageable with the larger radius surface 31 during the downward movement of the stem 23, namely, during the closing movement of the valve, causing the area of contact between the surfaces 29 and 31 to be located centrally, which reduces turning friction to a minimum. Also, the space around the point of contact serves as an encircling lubricant cavity for retaining lubricant between the convex element 29 and the concave surface 31. Due to the existence of a slight amount of play, when the hand wheel 25 is turned in a direction to elevate the stem 23, the head 28 rises slightly in the groove 30 before it engages the top wall of the groove. This small rise of head 28 causes the center point of contact of surface portion 29 to separate from contact with the center of the concave seat 31, which brings about lubrication of the contact areas by reason of capillary action, each time the valve is opened and closed. This capillary attraction will hold sufficient light lubricant in the space between the elements 29 and 31 to provide efficient lubrication action between head 28 and the valve body 20. The capillary attraction will also hold the lubricant in the pivot cavity regardless of the position in which the valve body 20 is placed in the cylindrical cavity 17.

The valve body member 20 is formed with the annular bottom rib or flange 32 defining an annular space 33 between the bottom rim of the bushing 22 and the annular rib or flange 32. Thus, said bottom rim of bushing 22 defines a top shoulder over annular space 33. Disposed sealingly in this space is the resilient deformable O-ring 34 which has a generally circular normal cross section whose diameter is slightly greater than the distance between the cylindrical main wall of the valve body member 20 and the cylindrical inner wall surface of cavity 17 so that the sealing ring 34 is slightly compressed so as to be slightly flat on two opposite sides thereof, namely, the side in contact with the inside surface of cavity 17 and the side in contact with the cylindrical main lower portion of the body of the valve member 20. Thus, the O-ring 34 is compressed into a generally elliptical cross sectional shape, whereby it provides a sealing action even when it is in an intermediate position, such as that illustrated in FIGURE 2, in the space 33. Relative vertical movement of the member 20 with respect to the cavity 17 causes the ring 34 to roll rather than slide in the annular space 33, thus minimizing wear on the O-ring 34. When there is gas under pressure beneath the O-ring 34 in the space 33, the O-ring will be forced upwardly to the position of FIGURE 3, wherein it is forced into the region subjacent the bottom rim of the bushing member 22, and will conform in shape to this region, providing a further sealing action because of its contact with the bottom rim of the bushing member 22. When the valve is opened to its maximum opening position, the ring 34 is further sealingly contacted by the top surface of the flange 32 and is compressed thereby to assume a generally rectangular cross sectional shape, the amount of compression being limited by the provision of an annular stop shoulder 35 on the body 20 which is engageable with the mating downwardly facing internal stop shoulder 36 provided in the bore of the bushing member 22. The shoulders 35 and 36 engage to prevent excessive compression on the O-ring 34, but allow sufficient compression on said O-ring to cause it to assume a generally rectangular transverse cross sectional shape in close sealing contact on all four sides thereof with the adjacent valve elements. This provides a tight and effective seal between the members 20, 22, and 21 not only when the valve is in its fully opened position, but also when the valve is in an intermediate position or in a fully closed position. In the fully closed position of the valve the sealing disc 22 of resilient deformable material is sealingly engaged on the rim 18 and cuts off communication between passage 16 and conduit member 19.

As will be readily apparent from the above description, the O-ring 34 is always compressed to other than its natural round cross sectional shape but is never excessively compressed and is never rubbed by frictional sliding contact with any element. Thus, the ring 34 is protected against wear or deterioration by excessive pressure, so that it provides a long-lasting and effective seal between the movable valve element 20 and the main valve body 14.

The main body 14 of the valve assembly is integrally formed at its intermediate portion and opposite the conduit member 19 with the laterally extending hollow boss 37 which is internally threaded and which receives a replaceable safety valve assembly according to the present invention, designated generally at 38.

The assembly 38 comprises an annular main sleeve 39 which is externally threaded, as shown at 40. (FIGURE 7) and which is threadedly engageable with the internal threads 41 of the member 37. The member 37 is provided with a passage 42 which is in communication with the main passage 16 of body 14. The member 39 has an inner end wall 43 having a central aperture 44 which registers with the passage 42. The end wall 43 is provided with the external corner groove or recess 45 which is of annular shape and in which is received a resilient deformable sealing ring 46 which is urged into sealing contact with the annular inner end corner of the recess in the member 37 which receives member 39, as is clearly shown in FIGURE 7. The deformable sealing member 46 may be an O-ring of normally circular cross sectional shape which is deformed so as to have a generally rectangular cross sectional shape when it is compressed to conform with the shape of the annular groove or recess 45.

The end wall 43 is formed with the annular rim or seat 47 which faces outwardly, namely, to the left, as viewed in FIGURE 7, and which projects leftward, as viewed in FIGURE 7 from end wall 43, defining an annular groove 48 therearound. The body 39 has a generally cylindrical cavity 50 and slidably disposed therein is a plug member 51 having a plurality of longitudinally extending guide ribs 52 slidably engaged in the bore 50 and slidably supporting the member 51 in centered relationship therein. The member 51 is generally cup-shaped, having a cylindrical recess 53 on its left side, as viewed in FIGURE 7, and having a shallow cylindrical recess 54 on its right side, said recess 54 receiving a resilient deformable sealing disc 55 which is suitably secured in the recess and which is normally held in sealing contact with the annular rim 47. The cavity 53 receives one end of a coiled spring 56, said end bearing against the transverse main wall 57 of the member 51. The opposite end of the spring is received in a cylindrical cavity 59 formed in a externally threaded disc or plug 60 which is threadedly engaged in the outer end of the member 39 and which is locked therein in adjusted position by a locking pin 61, as shown in FIGURE 7. The spring 56 exerts a biasing force on the member 51, which is transmitted to the sealing disc 55, said biasing force being adjusted to a desired value by properly positioning the cover plug or disc 60. This value represents the maximum pressure to be permitted in the passage 16. The member 60 is provided with the vent passage 62 which allows venting of the bore 50 when the sealing disc 55 is moved outwardly away from the cooperating sealing rim 47 against the force of the biasing spring 56 when the pressure in passage 42 exceeds the pre-established safe high value deemed to represent the maximum permissible gas pressure in passage 16. As above mentioned, this value is established by the setting of the plug member 60, which tenses the spring 56 and which thereby establishes the relief pressure at which the valve will open. This value may be different for various gases, and therefore the appropriate safety valve 38 will be employed in accordance with the particular gas to be used in the container 11. It will be further noted that in the event of a defective safety valve 38, the valve may be readily replaced by unscrewing same from the member 37 and inserting a new valve of the required relief pressure rating.

As above mentioned, the threaded valve body 39 is sealed with respect to the member 37 by the compressed O-ring 46, the O-ring being sufficiently compressed to insure close sealing contact against all the surfaces surrounding same. Excessive compression of the sealing ring is avoided by the abutment of the inner end portion of wall 43 with the transverse inner end wall surface of the recess in member 37 which receives body 39.

It will be noted that the safety valve 38 is a replaceable unit whose parts may be assembled and preset at the factory, and that when the safety valve 38 of a complete assembly 13 is to be replaced, it is not necessary to remove the entire assembly, as has been done in the case of the structures of the prior art, but that it is merely necessary to unfasten the safety valve 38 and replace same. The replacement safety valve can have precisely the same relief pressure setting as the original safety valve 38.

The body 39 of the safety valve assembly 38 is provided at its inner end with a plurality of clean-out apertures 64 which are uniformly spaced around the axis of the body 39 and which are located adjacent the annular space 48. The ports 64 establish communication between the passage 42 and the interior of the bore 50, as well as with the vent passage 62 when the unit 38 is slightly loosened in the member 37 by slightly unscrewing same in the threads 41. When this is done, gas under pressure from passage 42 is allowed to travel around the inner end portion of the body 39 and through the space provided by the loosened engagement of the threads 40 and 41 at the inner end of body 39, and through the aperture 64. The gas under pressure blows through the bore 50 and discharges through the vent opening 62, acting as a clean-out means to remove sand, dirt, moisture or other small lose undesired accumulations of foreign material from the interior of the body 39. Thus, the safety valve 38 may be kept in good working order by occasionally loosening the same relative to the threads 41 for clean-out action, after which it may be again tightened to seal it against leakage.

As shown in FIGURE 3, the end of the member 39 is provided with a hexagonal flange 65 to facilitate engagement thereof by a suitable wrench.

When the safety valve unit 38 is loosened in the manner above described, the sealing pressure on the O-ring 46 is released, so that gas may readily flow therepast and toward the loosened interengaging threads 40 and 41, eventually passing through the blow-out apertures 64 into the interior bore 50 of member 39. When the safety valve unit 38 is subsequently retightened, the O-ring 46 is again compressed to its substantially rectangular shape, such as that illustrated in FIGURE 7, the rectangular cross section of the ring 46 being elongated in a transverse direction, as compared with its axially extending side, as shown in FIGURE 7.

Because of the transversely elongated shape of the rectangular cross section of the annular space defined between the groove or recess 45 and the annular inner corner portion of the cavity in member 37, the O-ring 46 is compressed to fill said space when the safety valve unit 38 is tightened in place, but returns to its natural circular cross sectional shape when the safety valve unit is loosened, whereby it clings to the annular stud defined centrally at the inner end of the body 39 by the groove 45 and whereby its cross sectional diameter in a transverse direction decreases, providing clearance therearound for gas to pass between the O-ring and the adjacent surfaces of the cavity in the member 37.

The level-indicating portion of the assembly 13 comprises a depending channel member 70 which is rigidly secured to the lower end portion of the bottom conduit member 15 of body 14 and which is bent at 71 so that it is inclined downwardly and laterally from the member 15, as is clearly shown in FIGURE 3. The side walls of the member 70 converge downwardly at the lower end portion of said member and terminate at their lower ends in the pair of parallel spaced lugs 72, 72 between which a float lever rod 73 is pivotally connected at 74. The lever rod 73 has a relatively long arm extending from one side of the pivotal connection 74, as shown at 75, to the end of which is pivotally connected at 76 a generally U-shaped float member 77 of magnesium, or similar relatively light metal. The float member 77 is generally circular in transverse cross sectional shape, but is provided with the rectangular longitudinally extending top groove 78 for a purpose presently to be described.

Pivotally connected at 79 to the opposite end of the lever 73, namely, to the end of the shorter arm 80 thereof is a counterweight 81 of relatively heavy metal, such as lead, or the like, the counterweight being formed with the central groove or slot 82 which receives the end of the arm 80 and wherein the pivotal connection 79 is made. As shown in FIGURE 1, the center of gravity of the counterweight 81 is located below the pivotal connection 79, and the end wall 83 of the counterweight flares downwardly somewhat in thickness.

By employing a metal of low specific gravity for the float member 77 and a metal of relatively large specific gravity for the counterweight 81, the action of the float lever 75 depends upon the specific gravity ratio between the metals employed for the members 77 and 81 as well as the displacement in terms of volume of the members.

By suitably locating the pivotal or fulcrum connection 74 between the depending support 70 and the float arm 73, the moments acting on the float lever 73 may be controlled so that the float member 77 always follows the level of the liquid in the vessel 11, as illustrated in FIGURE 1 wherein several liquid level locations are shown in dotted view, along with the dotted view positions of the float lever 73 and associated float and counterweight members. Thus, in the lowermost level shown at the bottom of the vessel 11 in dotted view in FIGURE 1, the float member 77 assumes a horizontal position where it is partially immersed in the liquid, the counterweight 81 being then in an elevated position. Thus, at the lowermost level shown in dotted view in FIGURE 1 at 84, the longer arm portion 75 of the float lever 73 is inclined downwardly and to the left, as viewed in FIGURE 1, from the pivotal connection 74, at a relatively steep angle. Conversely, when the level of liquid in the container 11 is relatively high, for example, as shown in dotted view at 85 in FIGURE 1, the float member 77 again assumes a substantially horizontal position partly immersed in the liquid, with the arm portion 75 inclined upwardly and to the left, as viewed in FIGURE 1, from the pivotal connection 74, at a relatively steep angle, the counterweight member 81 being fully immersed. At intermediate liquid levels between the levels 84 and 85 the float member 77 maintains a substantially horizontal position, partially immersed, for example, in the full line view position of the float member of FIGURE 1 with the liquid level shown at 86.

As above mentioned, there are a number of interrelated factors which control the action of the float member 73, these factors including the relative specific gravities of the metals comprising the float member 77 and the counterweight 81, the relative volumes of the members 77 and 81, and the location of the pivot connection 74 between the support 70 and the float lever 73. In the typical design illustrated, which represents the preferred embodiment of the invention, the float member 77 has a volume slightly greater than the volume of the counterweight member 81, the float member 77 being made of magnesium and the counterweight member 81 being made of lead.

As will be presently apparent, the shapes of the members 77 and 81 are selected so that these members are readily foldable in relation to the supporting member 70 to facilitate the removal of the assembly 13 from the container 11, or the installation thereof in the container. In the preferred design illustrated, the arrangement is such that with an empty container 11, the mechanism will automatically fold to a position wherein all the elements thereof assume substantially parallel longitudinal axes when the container is tipped to the left from the position thereof shown in FIGURE 1 after the assembly 13 has been unscrewed from the neck 12, facilitating the removal of the assembly from the container.

Pivotally connected at 87 to the arm portion 75 of lever 73 at a location adjacent to the pivotal connection 74 is the lower end of a link rod 88, the connection 87 being at the lower end of a lower offset portion 89 of said link rod. As shown in FIGURE 3, the upper portion of link rod 88, namely, the portion above the offset rod section 89, is received within the channel-shaped support 70. The top end of the link rod 88 is bent first at 90 adjacent the bottom rim of the depending member 15, the portion thereabove extending through member 15 and being bent again at 91. The top end of the link rod is provided with a horizontally extending pivot lug 92 which is pivotally connected to the upper portion of a cup member 93 of magnetic material, said cup member being in turn pivotally connected at its intermediate portion to the body 14, as by a pivot pin 95.

The bends 90 and 91 cooperate with the surface of the vertical bore 96 in member 15 to limit the lateral movement of the upper portion of the rod member 88 and to correspondingly limit the rotation of the cup member 93 to a range corresponding to the span of the indicating scale of the device.

A bar magnet 98 is received in and magnetically retained in the cup member 93, the bar magnet fitting in the cup member and having a convexly curved external face 99 which extends adjacent to a vertical partition disc 100 of non-magnetic material which is sealingly secured against an annular seat 101 in the form of an annular sealing rib provided at the inner end of an internally threaded bore 102 formed in the body 14 and extending horizontally therein. The disc member 100 may be made of deformable sealing material, being clamped in sealing contact against the annular sealing ring 101 by a cup-shaped plug member 103 threadedly engaged in the bore 102 and having its annular inner rim in annular contact with the peripheral margin of the disc 100, as shown in FIGURE 2. An indicator shaft 104 is rotatably mounted axially in the cup member 103, being arranged in axial alignment with the pin 95, and secured to the inner end of the shaft 104 is another magnet-supporting cup 105 of magnetic material in which is disposed a second bar magnet 106. The permanent bar magnet 106 is received in and magnetically retained in the cup 105, and is provided with the convex external longitudinal edge 107 which is located closely adjacent to the partition disc 100, opposing the bar magnet 98.

The partition disc 100 is preferably formed with opposing generally conical outwardly convergent opposite faces which are substantially in pivotal contact at their vertices or centers with the centers of the opposing bar magnet arcuate surfaces 99 and 107, thereby defining pivotal bearings for said arcuate surfaces. Said pivotal bearings are substantially on the same axis as the pivot pin 95 and indicator shaft 104.

The opposing bar magnets 98 and 106 exert magnetic attraction on each other and are held constantly in opposing parallel relationship by said magnetic attraction. Therefore, the bar magnet 106 follows the movement of the bar magnet 98, which is in turn produced through the link bar 88 by the movement of the float lever 73 as the level of liquid in the container 11 varies. It will be noted from FIGURE 3 that the link rod 88 is connected to the cup-like magnet holder 93 in a manner to exert crank action thereon and to thereby rotate the magnet 98 in accordance with the changes in height of the float member 77. The magnet 106 will follow the rotation of the magnet 98 and will therefore rotate the shaft member 104 simultaneously with rotation of the magnet 98.

Secured to the outer end of the indicator shaft 104 is an indicating pointer 108 which extends upwardly and is bent rearwardly at its top portion, as shown at 109, so that it overlies and extends parallel to a stationary arcuate scale plate 110 mounted in a recess provided therefor in the body 14 and shown at 111. Secured to body 14 and covering the cavity 102 and the recess 111 is an opaque metal cover plate 112 which is provided with an arcuate transparent window 113 at its top portion adjacent to and overlying the scale plate 110 and the pointer element 109, as is clearly shown in FIGURE 2.

The scale plate 110 is suitably calibrated, for example, in volumetric units, whereby the pointer element 109 shows the volume of liquid remaining in the container 11.

The assembly 13 also includes a maximum volume test valve, designated generally at 113, for checking the accuracy of the reading of indicator pointer 108 when the level of the liquid in the container 11 is at a height corresponding to the maximum indication on scale plate 110. Thus, the body 14 is formed with a boss 114 having a horizontal bore 115 communicating with a horizontal passage 116 formed in the body 14. An annular sealing rib 117 is integrally formed in the body 14 around the end of the passage 116, projecting into the cavity 115 and being sealingly engaged by a sealing disc 118 of resilient deformable sealing material secured in a circular cavity 119 formed in the end of a plug member 120 which is threadedly engaged in the boss 114, as shown in FIGURE 6. A vertical passage 121 is formed in the depending portion 15 of body 14, said vertical passage communicating with the inner end of the horizontal passage 116. A depending conduit member 122 is connected to the bottom end portion of the depending element 15 in communication with the bottom end of the passage 121, as shown in FIGURE 6. The conduit member 122 is secured to a side edge portion of the depending support member 70 and extends downwardly to a point corresponding to the maximum indicated liquid level on scale plate 110, terminating at said point and being open thereat.

The body 14 is formed with a horizontally extending vent passage 124 communicatively connecting the cavity 115 to the atmosphere. By loosening the plug 120, the disc 118 may be unseated, thereby establishing communication between passage 116 and the atmosphere, through the vent passage 124. When the liquid under pressure in the container 11 is at the level corresponding to the maximum or "full" reading on the scale plate 110, the opening of the valve plug 120, as above described, will allow pressurized liquid entering the bottom end of conduit 122 to discharge from the vent port 124. This is an indication of the completely filled condition of the container 11, and the indicating pointer element 109 should provide a corresponding indication on the scale plate 110 under these conditions. The failure of the pointer element 109 to provide such an indication shows that there is an inaccuracy, defect, or error in calibration of the indicating mechanism.

Under normal conditions the plug member 120 will be in its tightened closed position, and said plug member will be loosened only when it is desired to check the accuracy of reading of the pointer element 109 with the container in its full condition. When the level of liquid in the container 11 is below its maximum or "full" position, there will be a discharge of gas only when the plug 120 is loosened to allow communication between passage 116 and the vent passage 124.

As previously mentioned, the bends 90 and 91 in the link rod 88 cooperate with the inner surface 96 of member 15 to limit the cranking action of link rod 88 on the magnet casing 93. When the float member 77 is in its lowermost position, for example, in the position corresponding to the level position 84 of FIGURE 1, wherein the container 11 is substantially empty, the rod portion 125 located between the bends 90 and 91 flatly engages against the surface of the bore 96 at the right side thereof, as viewed in FIGURE 3, preventing further rightward movement of the rod portion 125, thereby limiting the counterclockwise rotation of the casing 93, as viewed in FIGURE 3, to a position which provides the zero indication on scale plate 110 by the pointer element 109. The stop means thus defined prevent damage to the indicating mechanism during the handling of the assembly 13 when it is detached from the container 11.

It will be noted that the link rod 88 is provided with the offset 89 at its lower portion, including the right angled offset portion 126. The offset 89 is provided because it is necessary that the portion of the link rod 88 thereabove be maintained substantially parallel to and be received within the channel-shaped support member 70 along the entire length of the top side of the float member 77 when the gauge means is folded for removal or insertion with respect to a container 11. The float member 77 must be received within the channel-shaped member 70 in order to reduce the overall cross sectional size of the assembly sufficiently to allow it to pass through the boss 12. Thus, the float member 77 is of circular cross sectional shape of sufficiently small diameter to be received within the channel-shaped support member 70, and the portion of link rod 88 above the offset 89 is receivable in the longitudinal top groove 78 provided in the float member. The counterweight 81 has a maximum diameter which is smaller than the minimum inside diameter of the threaded bore in the boss 12 so that the counterweight 81 can also pass through the bore in boss 12 with the counterweight adjusted so that the arm 80 is received in the slot 82.

It will therefore be apparent that the channel-shaped member 70 may have a semi-circular cross sectional shape with an inside diameter small enough to receive the float member 77 closely therein and with an outside diameter small enough so that the folded assembly will pass through the boss 12.

As shown in FIGURE 1, the pivotal connection 76 between arm 75 and the float member 77 is located at a point which substantially corresponds to the liquid level in the container 11, the float member 77 being balanced around the pivotal connection 76 so that it assumes a horizontal position, partly submerged in the liquid. It will be seen that with this desired arrangement, the center of gravity of the float member 77 will be located near a vertical plane containing the axis of the pivotal connection 76.

From the above discussion, it will be apparent that the assembly can be readily installed in a container in its folded position by passing the respective elements thereof through the boss 12 with the float lever 73 held against and received in the support 70, as above described. After the externally threaded portion 15 has been threadedly engaged with the internal threads in the boss 12, the pressurized liquid may be admitted into the container 11 employing the control valve assembly previously described. Thus, the source of pressurized liquid is connected to the conduit connection member 19, and the control valve is opened by means of the hand wheel 25 to allow the liquid to be admitted into the container 11. As the container receives the liquid, the level therein rises, the level being indicated on the scale plate 110 by the pointer element 109. After the container has been filled, the control valve portion of the assembly 13 may be closed by means of the hand wheel 25, and the connection conduit leading to the supply source may be disconnected from the element 19. The conduit leading to the device to which the pressurized liquid contents of container 11 is to be furnished is then connected to the conduit connection member 19, and the material from the container 11 can then be furnished to said using device by opening the control valve portion of assembly 13 by means of hand wheel 25. As previously described, this is accomplished by elevating the valve body 20 to disengage the sealing disc 22 from the sealing rib 18.

The assembly may be removed from a container by following a procedure reverse to that above described. As previously mentioned, the weight distribution of the float member 77 is preferably such that the float member will assume a substantially horizontal position partly immersed in the liquid in the container 11. However, it is desirable that the distribution be such that when the container is empty the float member be biased to rotate slightly counterclockwise from its horizontal position, to facilitate the folding of the device when it is to be removed from the container, as will be presently described. Thus, the pivotal connection 76 is located so that there is slightly more weight at the left side thereof than at the right side, as viewed in FIGURE 1.

In removing the assembly from an empty container, the member 15 is first unscrewed from the boss 12, and is positioned with the indicating scale plate 110 facing forwardly, as in FIGURE 1. In this position the support 70 extends downwardly and to the right, as viewed in FIGURE 1. The container is then tipped in a counterclockwise direction, and is rotated through three quarters of a complete revolution in this direction so that finally the neck portion 12 extends horizontally and to the right, having been rotated through 270° counterclockwise from the position of FIGURE 1. By this rotation of the container, the float member 77 and the adjacent float lever portion 75 will be nestingly received within the channel-shaped support 70, the channel-shaped support 70 being then disposed below and in supporting relationship to the elements 75 and 77, and the counterweight 81 will then be disposed in a position which is substantially in alignment with the channel-shaped support member 70. With the parts thus aligned, the device may be easily withdrawn from the container 11 through the neck portion 12. Insertion of the device in a container 11 may be accomplished by following a procedure reverse in that above described.

While a specific embodiment of an improved combination metering valve, relief valve and level-indicating assembly for a liquid container has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A metering valve assembly for a liquid container comprising a main body having a depending connection conduit portion adapted to be connected to a liquid container and a laterally extending conduit portion adapted to be connected to a using device, said body being formed with a passage communicatively connecting said conduit portions and including a peripheral valve seat and a vertical cavity above said valve seat, a metering valve body slidably mounted in said cavity, a deformable sealing member secured to the bottom of said last-named valve body and being sealingly engageable on said seat, means to move said last-named valve body vertically in said cavity, whereby to move the sealing member toward and away from said seat, a resilient deformable sealing ring disposed between and in resilient rolling and sealing contact with said last-named valve body and the surface of said cavity, said ring being slightly compressed normally so that it is slightly flat on its inner and outer sides, whereby it has a generally elliptical cross-sectional shape, said cavity being provided with means defining a top shoulder surrounding said last-named valve body, and flange means on said last-named body, said sealing ring being located between said top shoulder and said flange means, said last-named valve body being movable vertically sufficiently to compress the sealing ring between said top shoulder and said flange means so that the ring has a generally rectangular cross-sectional shape.

2. A metering valve assembly for a liquid container comprising a main body having a depending connection conduit portion adapted to be connected to a liquid container and a laterally extending conduit portion adapted to be connected to a using device, said body being formed with a passage communicatively connecting said conduit portions and including a peripheral valve seat and a vertical cavity above said valve seat, a metering valve body slidably mounted in said cavity, a deformable sealing member secured to the bottom of said last-named valve body and being sealingly engageable on said seat, means to move said last-named valve body vertically in said cavity, whereby to move the sealing member toward and away from said seat, a resilient deformable sealing ring disposed between and in resilient rolling and sealing contact with said last-named valve body and the surface of said cavity, said ring being slightly compressed normally so that it is slightly flat on its inner and outer sides, whereby it has a generally elliptical cross-sectional shape, said cavity being provided with means defining a top shoulder surrounding said last-named body, flange means on said last-named body, said sealing ring being located between said top shoulder and said flange means, said last-named valve body being movable vertically sufficiently to compress the sealing ring between said top shoulder and said flange means so that the ring has a generally rectangular cross-sectional shape, and cooperating further shoulder means carried on the main body and said last-named valve body limiting the upward vertical movement of said last-named valve body to limit the amount of compression on the sealing ring.

3. A metering valve assembly for a liquid container comprising a main body having a depending connection conduit portion adapted to be connected to a liquid container and a laterally extending conduit portion adapted to be connected to a using device, said body being formed with a passage communicatively connecting said conduit portions and including a peripheral valve seat and a vertical cavity above said valve seat, a metering valve body slidably mounted in said cavity, a deformable sealing member secured to the bottom of said last-named valve body and being sealingly engageable on said seat, a vertical stem member threadedly engaged in the top portion of the main body and being provided with an axial depending headed bottom stud portion having a convex spherical bottom surface, said metering valve body being formed with an inverted T-shaped groove rotatably receiving said stud portion and having a concave spherical bottom wall surface of larger radius than that of said convex spherical surface and being adapted to provide a pivot bearing for said convex spherical surface, said stud portion and T-shaped groove operatively connecting the stem member to the metering valve body to move said last-named valve body vertically in said cavity, whereby to move the sealing member toward and away from said seat, and a resilient deformable sealing ring disposed between and in resilient rolling contact with said last-named valve body and the surface of said cavity.

4. A metering valve assembly for a liquid container comprising a main body having a depending connection conduit portion adapted to be connected to a liquid container and a laterally extending conduit portion adapted to be connected to a using device, said body being formed with a passage communicatively connection said conduit portions and including a peripheral valve seal and a vertical cavity above said valve seat, a metering valve body slidably mounted in said cavity, a deformable sealing member secured to the bottom of said last-named valve body and being sealingly engageable on said seat, a vertical stem member threadedly engaged in the top portion of the main body and being provided with an axial depending headed bottom stud portion having a convex spherical bottom surface, said metering valve body being formed with an inverted T-shaped groove opening at one side of said metering valve body and rotatably receiving said stud portion and having a concave spherical bottom wall surface of larger radius than that of said convex spherical surface, said concave spherical bottom wall surface being adapted to provide a pivot bearing for said convex spherical surface, said stud portion and T-shaped groove operatively connecting the stem member to the metering valve body to move said last-named valve body vertically in said cavity responsive to rotation of said vertical stem member, whereby to move the sealing member toward and away from said seat, and a resilient deformable sealing ring disposed between and in resilient rolling contact with said last-named valve body and the surface of said cavity.

5. A metering valve assembly for a liquid container comprising a main body having a depending connection conduit portion adapted to be connected to a liquid container and a laterally extending conduit portion adapted to be connected to a using device, said body being formed with a main passage communicatively connecting said conduit portions and including a peripheral valve seat and a vertical cavity above said valve seat, a metering valve body slidably mounted in said cavity, a deformable sealing member secured to the bottom of said last-named valve body and being sealingly engageable on said seat, means to move said last-named valve body vertically in said cavity, whereby to move the sealing member toward and away from said seat, a resilient deformable sealing ring disposed between and in resilient rolling contact with said last-named valve body and the surface of said cavity, said main body being formed with a hollow boss and with a lateral passage communicatively connecting said hollow boss to said main passage at a location between said depending connection conduit portion and said peripheral valve seat, a vented, pressure-responsive relief valve unit threadedly secured in said hollow boss and exposed to said lateral passage, said relief valve unit comprising a hollow body vented at its outer end and formed with an inwardly flanged aperture at its inner end, a transversely extending sealing member slidably mounted in said last-named hollow body and having a deformable sealing portion sealingly engageable with said inwardly flanged aperture, and a pressure relief spring in said last-named hollow body bearing on said sealing member and urging said deformable sealing portion toward sealing contact with said inwardly flanged aperture, the side wall of said last-named hollow body being formed with at least one blow-through aperture adapted to establish communication between said lateral passage and the vented interior of the last-named hollow body when said relief valve unit is partially unscrewed in said hollow boss.

6. A metering valve assembly for a liquid container comprising a main body having a depending connection conduit portion adapted to be connected to a liquid container and a laterally extending conduit portion adapted to be connected to a using device, said body being formed with a main passage communicatively connecting said conduit portions and including a peripheral valve seat and a vertical cavity above said valve seat, a metering valve body slidably mounted in said cavity, a deformable sealing member secured to the bottom of said last-named valve body and being sealingly engageable on said seat, means to move said last-named valve body vertically in said cavity, whereby to move the sealing member toward and away from said seat, a resilient deformable sealing ring disposed between and in resilient rolling contact with said last-named valve body and the surface of said cavity, said main body being formed with a hollow boss and with a lateral passage communicatively connecting said hollow boss to said main passage at a location between said depending connection conduit portion and said peripheral valve seat, a vented pressure-responsive relief valve unit threadedly secured in said hollow boss and exposed to said lateral passage, said relief valve unit having a reduced inner end portion defining a peripheral recess, a resilient deformable sealing ring disposed in said recess and being compressible between the inner end of the relief valve unit and the inner end of the cavity of said hollow boss to seal the relief valve unit relative to said main body, the side wall of said last-named hollow body being formed with at least one blow-through aperture adapted to establish communication between said lateral passage and the vented interior of the last-named hollow body past said last-named resilient deformable sealing ring when said relief valve unit is partially unscrewed in said hollow boss.

7. A metering valve assembly for a liquid container comprising a main body having a depending connection conduit portion adapted to be connected to a liquid container and a laterally extending conduit portion adapted to be connected to a using device, said body being formed with a main passage communicatively connecting said conduit portions and including a peripheral valve seat and a vertical cavity above said valve seat, a metering valve body slidably mounted in said cavity, a deformable sealing member secured to the bottom of said last-named valve body and being sealingly engageable on said seat, means to move said last-named valve body vertically in said cavity, whereby to move the sealing member toward and away from said seat, a resilient deformable sealing ring disposed between and in resilient rolling contact with said last-named valve body and the surface of said cavity, said main body being formed with a hollow boss and with a lateral passage communicatively connecting said hollow boss to said main passage at a location between said depending connection conduit portion and said peripheral valve seat, a vented pressure-responsive relief valve unit threadedly secured in said hollow boss and exposed to said lateral passage, said relief valve unit having a reduced inner end portion defining a peripheral recess, a resilient deformable sealing ring disposed in said recess and being compressible between the inner end of the relief valve unit and the inner end of the cavity of said hollow boss to seal the relief valve unit relative to said main body, said relief valve unit comprising a hollow body vented at its outer end and formed with an inwardly flanged aperture at its inner end, a transversely extending sealing member slidably mounted in said last-named hollow body and having a deformable sealing portion sealingly engageable with said inwardly flanged aperture, the outer end wall of said last-named hollow body including an adjustable threaded inwardly concave spring bearing cup member and a pressure relief spring in said last-named hollow body bearing between said bearing cup member and said sealing member and urging said deformable sealing portion toward sealing contact with said inwardly flanged aperture, the side wall of said last-named hollow body being formed with at least one blow-through aperture adapted to establish communication between said lateral passage and the vented interior of said last-named hollow body past said last-named resilient deformable sealing ring when said relief valve unit is partially unscrewed in said hollow boss.

8. A combination metering and level-indicating valve assembly for a liquid container comprising a main body having a depending connection conduit portion adapted to be connected to a liquid container and a laterally extending conduit portion adapted to be connected to a using device, said body being formed with a main passage communicatively connecting said conduit portions and including a peripheral valve seat and a vertical cavity above said valve seat, a metering valve body slidably mounted in said cavity, a deformable sealing member secured to the bottom of said last-named valve body and being sealingly engageable on said seat, means to move said last-named valve body vertically in said cavity, whereby to move the sealing member toward and away from said seat, a resilient deformable sealing ring disposed between and in resilient rolling contact with said last-named valve body and the surface of said cavity, a depending elongated support member rigidly secured to said depending connection conduit portion, a float lever pivoted at an intermediate portion thereof to the lower end of said support member, a magnesium float member pivoted to one end of said lever, a lead counterweight pivoted to the other end of said lever, liquid level-indicating means rotatably mounted in said main body, link means connecting said lever to said liquid level indicating means, said liquid level indicating means comprising an inner permanent magnet rotatably mounted in said main passage and being operatively connected to said link means, an outer permanent magnet rotatably mounted on said main body externally of said main passage and being magnetically coupled with said inner permanent magnet, an indicating pointer connected to said outer magnet, and a sealing disc of non-magnetic material interposed between said inner and outer permanent magnets and having opposed outwardly convex surfaces centrally in bearing contact with said magnets.

9. A combination metering and level-indicating valve assembly for a liquid container comprising a main body having a depending connection conduit portion adapted to be connected to a liquid container and a laterally extending conduit portion adapted to be connected to a using device, said body being formed with a main passage communicatively connecting said conduit portions and including a peripheral valve seat and a vertical cavity above said valve seat, a metering valve body slidably mounted in said cavity, a deformable sealing member secured to the bottom of said last-named valve body and being sealingly engageable on said seat, means to move said last-named valve body vertically in said cavity, whereby to move the sealing member toward and away from said seat, a resilient deformable sealing ring disposed between and in resilient rolling contact with said last-named valve body and the surface of said cavity, a depending elongated support member rigidly secured to said depending connection conduit portion, a float lever pivoted at an intermediate portion thereof to the lower end of said support member, a float member pivoted to one end of said lever, a counterweight pivoted to the other end of said lever, liquid level-indicating means rotatably mounted in said main body, and link means connecting said lever to said liquid level-indicating means, said liquid level-indicating means comprising an inner permanent magnet rotatably mounted in said main passage and operatively connected to said link means, an outer permanent magnet rotatably mounted on said main body externally of said main passage and being magnetically coupled with said inner permanent magnet, an indicating pointer connected to said outer permanent magnet, said permanent magnets having opposing convex edge portions, and a sealing member of non-magnetic material interposed between said permanent magnets and having opposed outwardly convex surfaces in bearing contact centrally with said opposing convex edge portions.

References Cited by the Examiner

UNITED STATES PATENTS

| | | | |
|---|---|---|---|
| 1,530,738 | 3/1925 | Resek | 73—317 |
| 1,641,380 | 9/1927 | Geyer | 73—290.1 |
| 1,881,269 | 10/1932 | Evans et al. | 251—214 |
| 2,121,675 | 6/1938 | White | 222—51 X |
| 2,341,579 | 2/1944 | Sundstrom | 222—5 |
| 2,646,245 | 7/1953 | Bedini | 251—214 |
| 2,687,142 | 8/1954 | Law | 73—222.5 |
| 3,012,437 | 12/1961 | Clark et al. | 73—317 |
| 3,084,902 | 4/1963 | Hare | 251—214 X |

FOREIGN PATENTS

| | | |
|---|---|---|
| 605,249 | 9/1960 | Canada. |
| 473,102 | 10/1937 | Great Britain. |

LOUIS R. PRINCE, *Primary Examiner.*

FRANK H. THOMSON, *Assistant Examiner.*